United States Patent

Calvert et al.

[11] 4,023,328
[45] May 17, 1977

[54] PACKAGING MACHINE

[75] Inventors: Rodney K. Calvert, Dunwoody; Dale K. Scott, Jonesboro, both of Ga.

[73] Assignee: The Mead Corporation, Dayton, Ohio

[22] Filed: Jan. 20, 1976

[21] Appl. No.: 650,805

[52] U.S. Cl. .................................. 53/157
[51] Int. Cl.² ............................... B65B 21/06
[58] Field of Search .............. 53/48, 49, 157; 93/37 SP

[56] References Cited

UNITED STATES PATENTS

| | | | |
|---|---|---|---|
| 2,687,069 | 8/1954 | Burger et al. | 93/37 SP |
| 3,031,813 | 5/1962 | Ganz | 53/157 |
| 3,473,295 | 10/1969 | Nigrelli et al. | 53/157 |
| 3,572,003 | 3/1971 | Perry et al. | 53/48 X |
| 3,848,519 | 11/1974 | Ganz | 53/186 X |
| 3,872,647 | 3/1975 | Langen et al. | 53/157 |
| 3,924,385 | 12/1975 | Walter | 53/157 X |
| 3,940,907 | 3/1976 | Ganz | 53/48 |

*Primary Examiner*—Robert Louis Spruill
*Attorney, Agent, or Firm*—Walter M. Rodgers; Walter A. Rodgers

[57] ABSTRACT

A packaging machine includes means for withdrawing insert blanks from a hopper and for prebreaking the parts which are detachably held in the planes of the blank and for subsequently manipulating each blank into partially set-up condition and for moving the partially set-up blank downwardly and around the necks of a group of bottles in such manner as to fold end tabs foldably joined to the partition tabs into flat face contacting relationship with the associated partition tabs by engagement of the end tabs with the necks of the associated bottles. According to one feature of the disclosure, the bottles are fed into positions wherein they are arranged in groups into which the inserts are lowered and the groups are controlled by suitable spacer elements movably mounted on an endless feed element each of which includes an article engaging pusher projection for imparting movement to a group of preceding articles together with an article engaging restraining projection which moves into the path of articles and restrains the movement of a succeeding group so as to control and precisely determine the position of the group of articles in order to insure cooperative and synchronous cooperation with means for securing the insert into a group of articles in such manner that two plys of material constitute separating partition means between adjacent articles.

4 Claims, 13 Drawing Figures

PACKAGING MACHINE

U.S. Pat. No. 3,904,036 issued September 9, 1975, and owned by the assignee of this invention discloses and claims a bottle container which is totally enclosed and which is specially adapted for use in conjunction with primary packages such as bottles having tapered neck portions.

U.S. Pat. application Ser. No. 632,226 filed Nov. 17, 1975, and owned by the assignee of this invention discloses and claims an insert which is specially adapted for use in conjunction with the container of the aforementioned patent and which is arranged for insertion from each of the open ends of the container. The two inserts are arranged so as to provide a double thickness separation between all adjacent bottles disposed within the container. The inserts are moved downwardly into cooperative engagement about a group of articles disposed at each of the open ends of the carton and thereafter each group of articles together with its associated insert is moved inwardly through an open end of the bottle container and when disposed in loaded positions, the end flaps of the open ended container are closed to complete the formation and loading of the container.

According to the present invention, a packaging machine is provided which is specially adapted for manipulating an insert blank as disclosed and claimed in the aforementioned application Ser. No. 632,226 into set-up condition and also for securing the insert about groups of articles. Means for controlling the position and orientation of the articles in order to condition each insert and its associated group of articles for subsequent insertion into the open ended container are provided according to one aspect of the invention. More specifically the machine of this invention comprises means for withdrawing insert blanks from a hopper and for prebreaking the various elements which are detachably maintained within the plane of the blank. Thereafter suitable guide means manipulate the main panels into flat face contacting relation with each other following the folding of partition tabs out of the planes of the associated main panels and the manipulation of the supplementary partition insert into normal set-up condition. Subsequent to the setting up of the insert, means are provided for moving it into cooperative engagement with a group of articles in such manner as to cause end tabs which are foldably joined to the partition tabs to engage the necks of bottles which in turn impart folding movement thereto to establish double thickness separators between adjacent bottles. In order precisely to position and control a group of bottles, suitable spacer elements are moveably mounted on an endless feed element and are provided with article engaging pusher projections and article engaging restraining projections manipulated by spacer control means in such manner as to control the forward movement of a group of articles so as to insure synchronous timed positioning thereof thereby to insure proper cooperation and registry of a set-up insert with its associated group of articles.

For a better understanding of the invention reference may be had to the following detailed description taken in conjunction with the accompanying drawings in which

FIG. 10 is a perspective view of the outfeed end of the machine and is somewhat similar to FIG. 3 but unlike FIG. 3 discloses the bottles to which inserts are applied and also shows feed control means by which movement and control of the bottles is effected and in which

Figures 1, 1A:
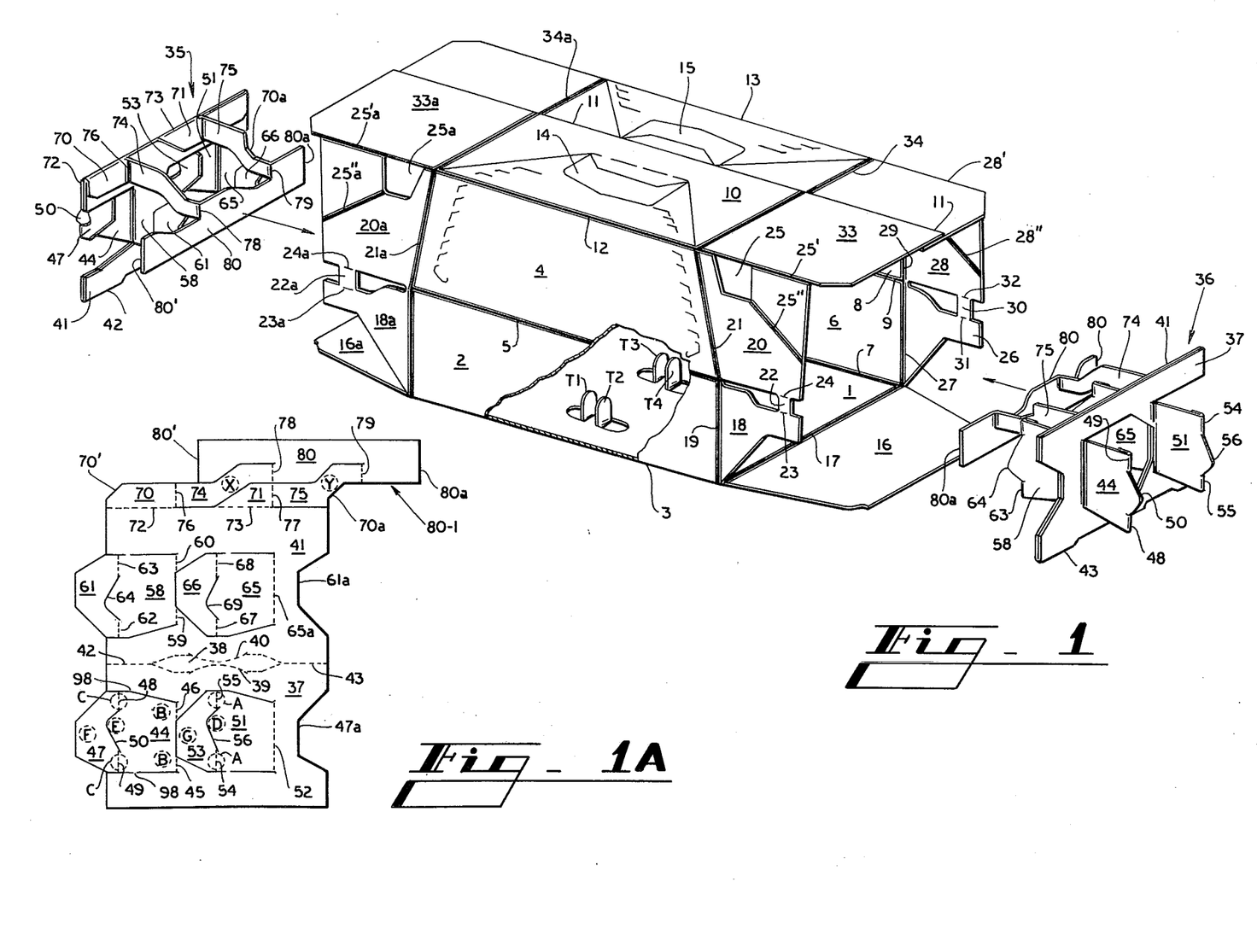
FIG. 1 is an exploded perspective view of a container together with a pair of set-up inserts arranged for movement into the open ends of the container.
FIG. 1A is a plan view of a blank from which the two inserts shown in FIG. 1 are formed.

A pair of inserts formed from the blank shown in FIG. 1A are manipulated into set-up condition and are inserted through the open ends of the bottle container as indicated in FIG. 1. In FIG. 1 the open ended sleeve-type carton shown in that figure comprises a bottom panel 1, a lower side wall panel 2 which is foldably joined to the side edge of bottom panel 1 along fold line 3 together with a sloping upper side wall panel 4 which is foldably joined to the lower side wall panel 2 along fold line 5. The other side of the carrier is similar in that a lower side wall panel 6 is foldably joined along fold line 7 to a side edge of bottom panel 1 and a sloping upper side wall portion 8 is foldably joined to lower side wall portion 6 along fold line 9. Top wall panel 10 is a composite panel and is overlapped at its mid-portion 11. Top panel 10 is foldably joined along fold line 12 to panel 4 and along fold line 13 to panel 8. A pair of hand gripping apertures 14 and 15 are formed in known manner in top panel 10.

The end flaps at the ends of the carton are identical and the flaps at only one end will be described, the flaps at the other end having the same numerals with the subscript *a* added. For example, bottom end panel 16 is foldably joined along fold line 17 to an end edge of bottom panel 1. Lower end flap 18 is foldably joined to panel 2 along fold line 19 while upper end flap 20 is foldably joined to panel 4 along fold line 21. Web panel 22 is foldably joined to panel 18 along fold line 23 and to panel 20 along fold line 24. Panel 20 is provided with an aperture 25 for receiving a part of the cap of the adjacent article such as a bottle and includes diagonal fold line 25″.

On the opposite side of the carton, lower end flap 26 is foldably joined to side wall 6 along fold line 27 while upper end flap 28 is foldably joined to panel 8 along fold line 29 and includes diagonal fold line 28″. Web panel 30 is foldably joined to lower end flap 26 along fold line 31 and to upper end flap 28 along fold line 32. Upper end panel 33 is a composite panel and is foldably joined to top wall 10 along fold line 34 and to panels 20 and 28 along fold lines 25' and 28' respectively.

As is apparent from FIG. 1, a pair of inserts designated generally by the numerals 35 and 36 are arranged for insertion through opposite ends of the open ended sleeve shown in FIG. 1. Inserts 35 and 36 are of identical construction although they are oppositely oriented and adjacent panels of the inserts are disposed in flat face contacting relation so as to afford a double thickness of material between articles disposed in one insert and the adjacent articles disposed in the other insert.

Inserts 35 and 36 are formed from the blank shown in FIG. 1A which comprises a main panel 37 which is interconnected along its bottom edge with a spacer panel 38 having serpentine side edges 39 and 40. Main panel 41 is interconnected with spacer panel 38 along serpentine fold line 40 and with main panel 37 along fold lines 42 and 43.

Partition tab 44 is struck from main panel 37 and is foldably joined thereto along separated fold lines 45 and 46. An end tab 47 is foldably joined to partition tab 44 along separated fold lines 48 and 49 and by a slit 50. Similarly partition tab 51 is struck from main panel 37 and is foldably joined thereto along fold line 52. End tab 53 is foldably joined to partition tab 51 along spaced fold lines 54 and 55 and is separated therefrom by slit 56. A slit 57 separates the outer end of end tab 53 from the base portion of partition tab 44.

Partition tab 58 is similar to partition tab 44 and is struck from main panel 41. Partition tab 58 is foldably joined to main panel 41 along spaced fold lines 59 and 60 and includes an end tab 61 foldably joined to partition tab 58 along coincidental separated fold lines 62 and 63 and is separated from partition tab 58 by slit 64. Partition tab 65 is also struck from main panel 41 and foldably joined thereto along fold line 65a. End tab 66 is foldably joined to partition tab 65 along coincidental fold lines 67 and 68 and is separated therefrom by slit 69.

A pair of anchoring tabs 70 and 71 are foldably joined to the top edge of main panel 41 along fold lines 72 and 73 respectively and are foldably joined to partition strips 74 and 75 along vertical fold lines 76 and 77 respectively. Partition strips 74 and 75 are foldably joined at their opposite ends along fold lines 78 and 79 respectively with partition panel 80.

In order to manipulate the blank of FIG. 1A into the condition represented by the perspective set-up insert 35, it is simply necessary to elevate main panel 41, partition panel 80 and all the parts interconnected therebetween upwardly along fold lines 42 and 43 and serpentine fold lines 39 and 40 to cause main panel 41 to assume a position of flat face contacting relation with main panel 37. This manipulative step causes the main panels 37 and 41 to become vertically disposed and causes spacer panel 38 to become horizontally disposed. Thereafter partition panel 80, partition strips 74 and 75 together with anchoring tabs 70 and 71 are folded forwardly and downwardly to cause the anchoring tabs 70 and 71 to occupy positions of flat face contacting relation with the upper portion of main panel 41. Thereafter partition strips 74 and 75 are swung along fold lines 76 and 77 simultaneously with swinging movement of partition panel 80 generally toward the left. When the partition strips 74 and 75 occupy positions of perpendicular relationship to main panel 41 and to partition panel 80, the insert is fully set up and is ready to be lowered onto a group of six bottles arranged in two rows of three bottles each.

As is obvious from FIG. 1 inserts are set up and loaded with their associated bottles through the open ends of the container. Thus the machine of this invention is arranged so as simultaneously to manipulate a pair of inserts such as are shown in FIG. 1A into set-up condition and then into cooperative relation with an associated group of articles. While most of the succeeding description is concerned with manipulation of one insert, it will be understood that an identical insert is simultaneously manipulated by the machine and then lowered into cooperative relation with an associated group of articles.

Figure 2:
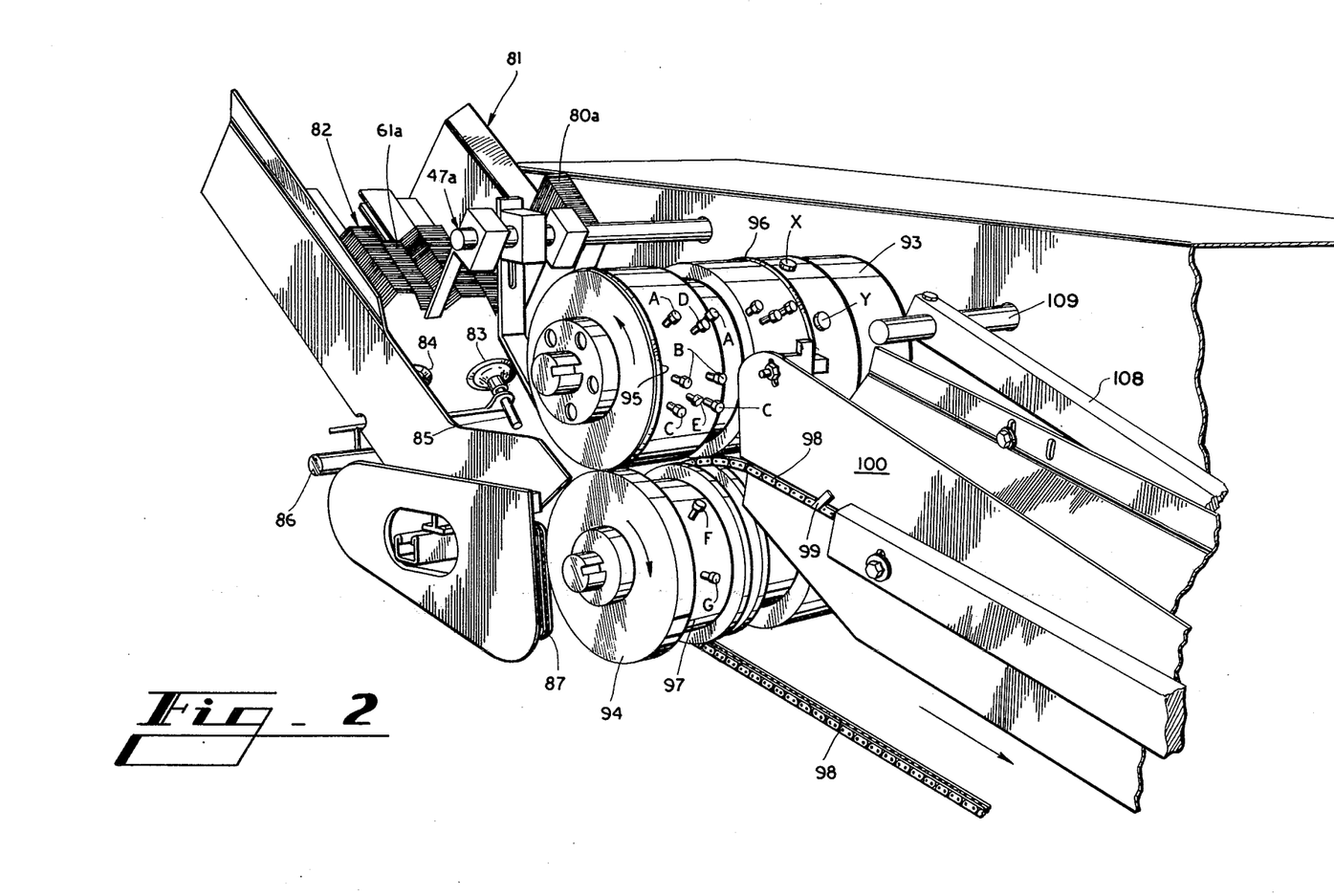
FIG. 2 is a perspective view of the infeed end of a machine constructed according to the invention.
Figure 3:
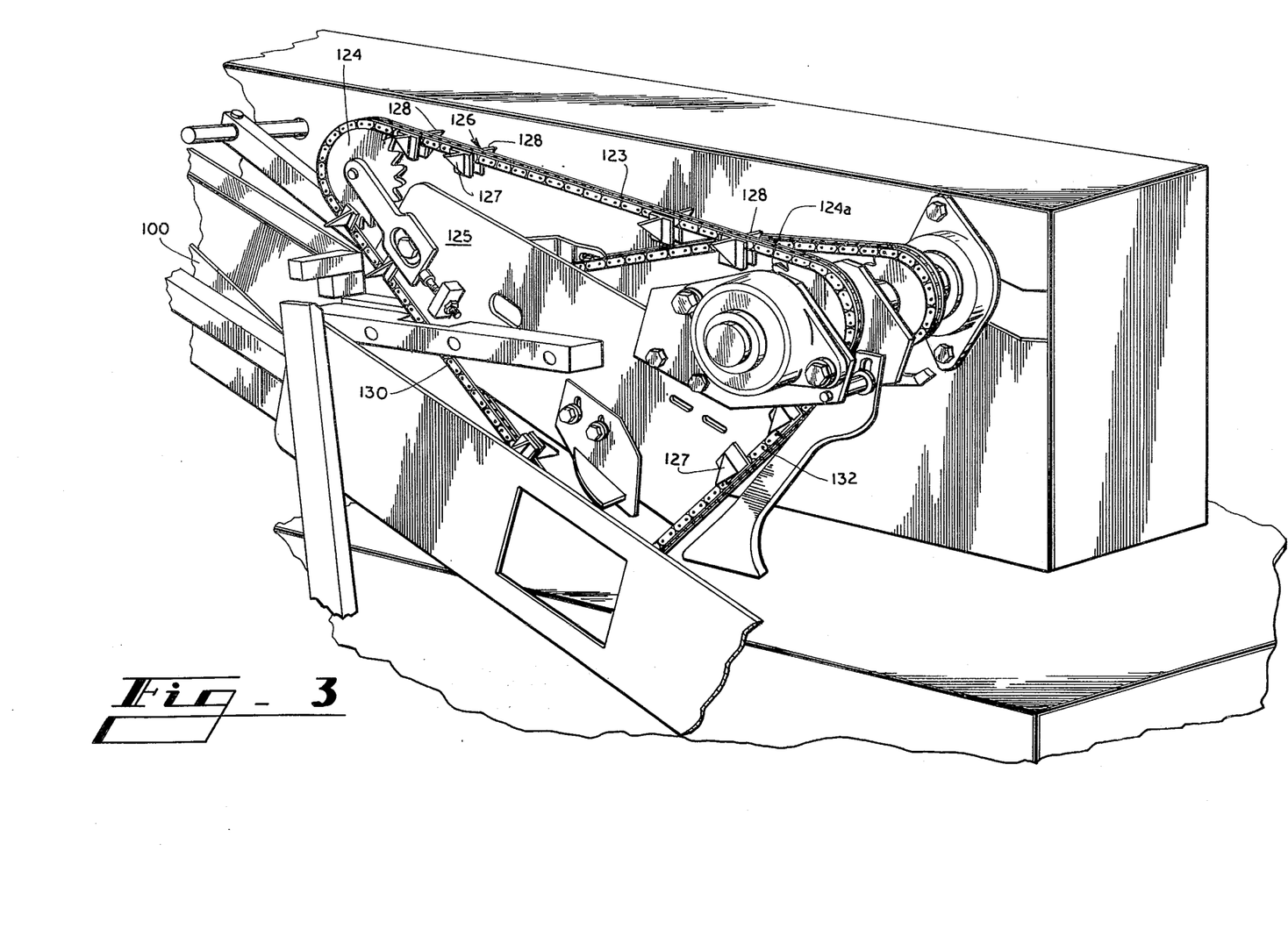
FIG. 3 is a perspective view of the outfeed end of a machine formed according to the invention and constitutes a continuation of FIG. 2.

In FIG. 2 a hopper structure generally designated by the numeral 81 includes a stack of blanks generally designated by the numeral 82. Of course blanks 82 are constructed as shown in FIG. 1A. The blanks 82 are arranged in hopper 81 in such manner that the end tabs 47 and 61 are disposed downwardly with notches 47a and 61a on the upper edge of the blank and so that the edge 80a of partition panel 80 is disposed to the right and upwardly or adjacent the center line of the machine. In FIG. 2 the notches 61a and 47a are identified and the edge 80a of the partition panel 80 of one blank is also identified. On the other side of the machine an identical blank is arranged with its partition panel 80 disposed immediately adjacent the partition panel 80 of the insert on the near side of the machine although the inserts and associated hopper structure on the far side of the machine are not shown in FIG. 2. Stated otherwise, the blanks are identical but are oriented in a complementary or mirror-like fashion so that the end tab 47 of the insert on the far side of the machine is most remote from the partition panel 80 of the insert on the far side of the machine.

In order to withdraw an insert such as 82 from the hopper structure such as 81, a pair of suction cups 83 and 84 are secured to a pivotally mounted arm 85 which reciprocates back and forth into engagement with the lowermost one of the blanks 82 about a center designated by the numeral 86. The suction cups 83 and 84 and the means for applying vacuum pressure thereto are manipulated in known manner and are reciprocated by known mechanism not shown in the drawings.

Figures 4, 5:
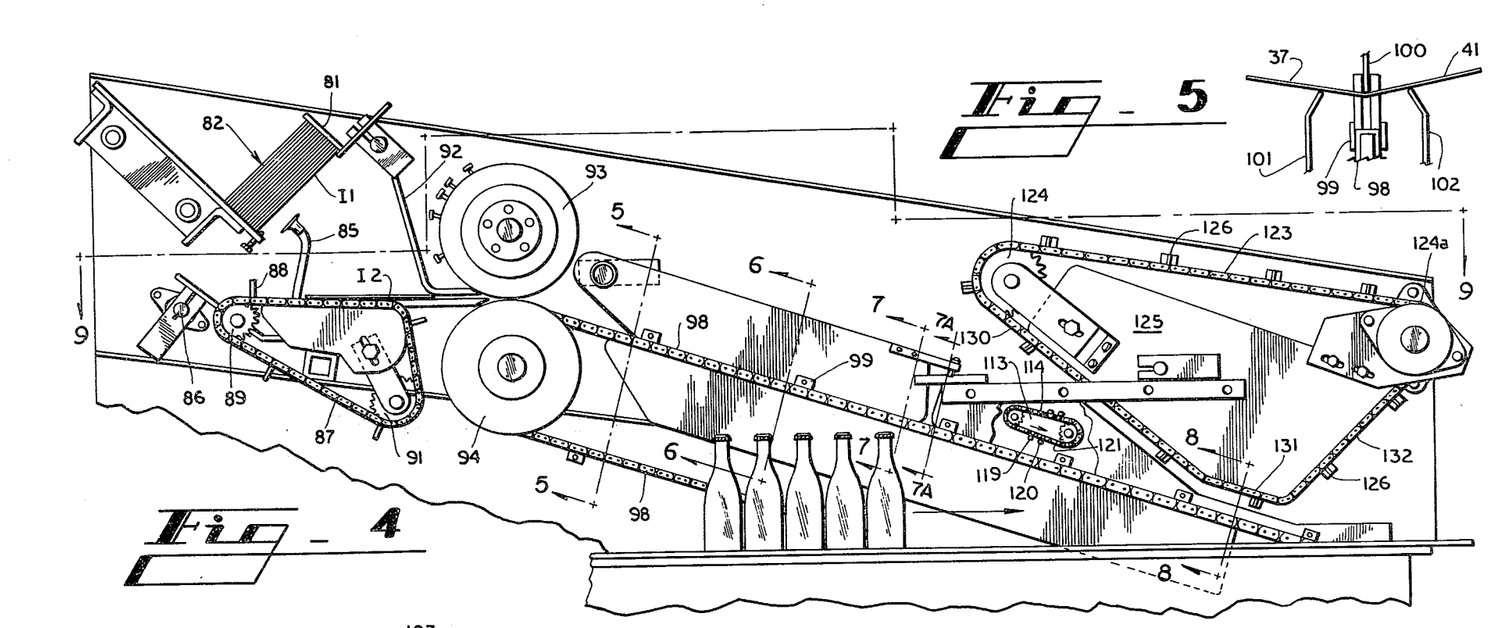
FIG. 4 is a side view of the machine shown in perspective in FIGS. 2 and 3.
FIG. 5 is a cross sectional view taken along the line designated 5—5 in FIG. 4.

As is apparent particularly from FIGS. 2 and 4 an insert blank such as is designated $I_1$ is withdrawn and deposited atop an endless conveyor 87 having pusher elements 88 and driven by driving sprocket 89 about fixed guide 90 and driven sprocket 91. Thus blank positioned as indicated at $I_2$ is moved by a pusher such as 88 underneath fixed guide 92 and between the nips of a pair of rotatable elements designated by the numerals 93 and 94. These rotatable elements are mounted on suitable shafts and bearings now shown and are driven by known means not shown. Of course the trailing edge of the blank such as that disposed as indicated at $I_2$ includes the end tabs 47 and 61 while the leading edge of the blank $I_2$ includes the recesses 47a and 61a.

In order to insure precise control of a blank as it moves between rotatable elements 93 and 94, O-rings formed of rubber are disposed about the periphery of rotatable element 93 and are designated by the numerals 95 and 96. These O-rings ride about the periphery of the adjacent parts of rotatable element 94 and since they are formed of high friction rubber, they insure precise alignment and positioning of a blank as it passes between the rollers.

For the purpose of prebreaking the partition tabs such as 44, 51, 58 and 65 from their associated main panels 37 and 41 and also in order to prebreak the various elements of supplementary partition structure 80-1 comprising anchoring tabs 70, 71, strips 74 and 75 and partition panel 80, a plurality of radially disposed tab engaging elements such as are designated at A, B, C, D and E on rotatable element 93 engage the underneath surface of the blank as shown in FIG. 1A at the dotted circular positions marked on partition tabs 44 and 51 by the letters A-G inclusive. This engagement causes the end tab 47 to move out of the plane of partition tab 44 due to the fact that this tab may move into a clearance channel designated by the numeral 97. By this means partition tab 44 and end tab 47 are freed for subsequent manipulation by the machine. In like fashion, partition tab 51 and end tab 53 as well as partition tabs 65 and 58 and their associated end tabs 66 and 61 are suitably manipulated and prebroken from their associated main panels 37 and 41. These partition tabs and the associated end tabs are then in condition for manipulation by the machine during subsequent operation. In like fashion the projections designated X and Y on rotatable element 93 engage the partition strips 74 and 75 at the dotted circles respectively designated by the letters X and Y on the underneath surface of the blank represented in FIG. 1A.

With the elements of a blank of FIG. 1A free to operate following prebreaking, the blank is moved to a subsequent operation by continuously moving means for advancing the blank and which may take the form of an endless chain designated by the numeral 98 and on which pusher lugs 99 are mounted. Each pusher lug 99 engages a blank at the fold line 42 and a main center guide 100 mounted above the blank is disposed in coincidence with the fold lines 42 and 43 and rides atop the panel 38. Disposed on either side of the main center guide 100 are fixed folding guides designated by the numerals 101 and 102 as best shown in FIG. 5. As is apparent in FIG. 5, upward folding of the main panels 37 and 41 is effected by guides 100-102.

Figure 6:
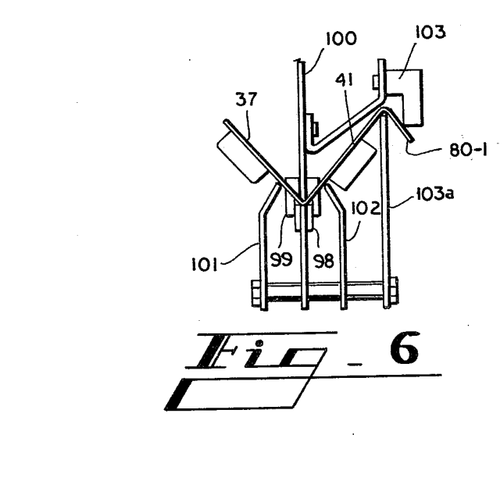
FIG. 6 is a cross sectional view taken along the line designated 6—6 in FIG. 4.

A subsequent stage of folding is represented by FIG. 6 and shows the panels 37 and 41 and supplementary partition structure 80-1 folded so that panels 37 and 41 occupy a V relationship to each other. A fixed supplementary folding guide 103 engages and folds supplementary partition structure 80-1 downwardly against the action of fixed folding guide 103a which engages the blank in the region of fold lines 72 and 73.

Figure 7:
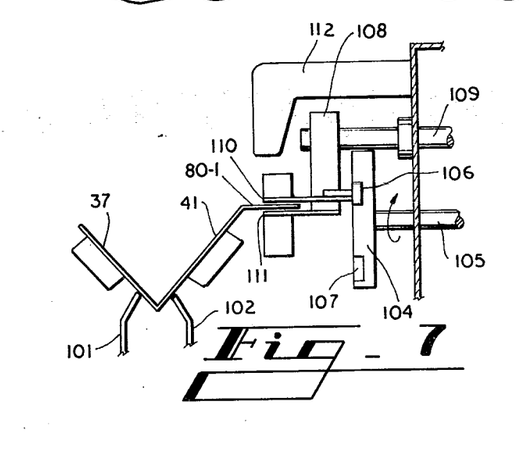
FIG. 7 is a cross sectional view taken along the line designated 7—7 in FIG. 4.
Figure 7A:
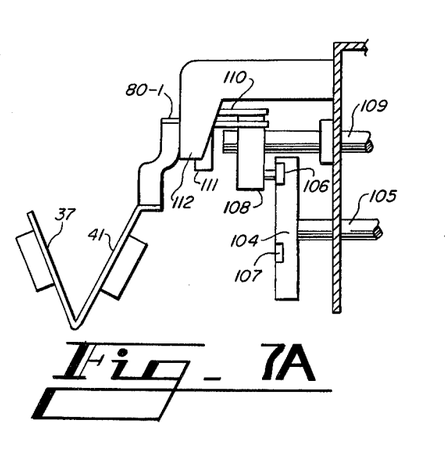
FIG. 7A is a cross sectional view taken along the line designated 7A—7A in FIG. 4

The machine continues folding the panels 37 and 41 toward each other and these panels ultimately are in face to face contact as shown in connection with the inserts 35 and 36 in FIG. 1. In the meantime supplementary partition structure 80-1 is manipulated into set-up condition by the structure shown in FIGS. 4 and 7. In FIG. 7 oscillatory means is shown and comprises a rotatable cam 104 mounted on a rotatable shaft 105 driven by any suitble means in synchronism with the machine together with a cam follower 106 which rides in a cam groove 107 formed in cam 104 together with an oscillatable element 108 supported by a pivot shaft 109 together with a pair of guide elements 110 and 111 which are secured to element 108. Such structure constitutes oscillatory means. A fixed stop 112 is adjacent and downstream from the oscillatory means. As is apparent in FIG. 7 supplementary partition structure 80-1 is slidably and loosely interposed between the guide elements 110 and 111 which reciprocate vertically and longitudinally to a limited extent due to the arcuate travel of the end of element 108. This action swings partition strips 74 and 75 into substantially vertical positions and causes panel 80 to occupy its uppermost position. The forward motion of a blank due to the operation of chain 98 and pusher lugs 99 then causes the end 80a of partition panel 80 to come into abutting engagement with fixed stop 112. This action continues swinging movement of partition strips 74 and 75 about their fold lines 76 and 77 and also imparts bodily movement to partition panel 80 which is accompanied by folding action along lines 78 and 79. This movement of partition panel 80 causes the partition panel 80 to move rearwardly relative to the main panels 37 and 40 and simultaneously swings partition strips 74 and 75 into flat face contacting relation with those portions of partition panel 80 which are disposed adjacent fold lines 78 and 79. This operation leaves the partition panel 80 disposed at a substantial angle to the associated main panel 41 as shown in FIG. 7A. Thus it is necessary following this manipulation of supplementary partition structure 80-1 to manipulate the structure in such a way as to swing the partition panel 80 into a position of approximately parallel and spaced relationship with respect to its associated main panel 41 before lowering the insert downwardly into a bottle group. Toward this end, folder means generally designated by the numeral 113 is provided and comprises an endless element 114 driven by means not shown and on which folding studs 119 and 120 are mounted. Folding stud 119 moves into engagement with the upper edge of panel 80 which is immediately adjacent fold line 78 and into the space from which the adjacent end of partition strip 74 is struck and simultaneously causes the folding stud 120 to move into engagement with the upper edge of partition panel 80 which is immediately adjacent fold line 79 and into the space from which the adjacent end of partition strip 75 is struck. Continued movement of endless element 14 in such manner and at a speed such that its working reach 121 moves fowardly and downwardly and causes the partition panel 80 to swing forwardly and downwardly into a position of approximately normal or perpendicular relationship with respect to partition strips 74 and 75. Simultaneously the downward component of movement of folding studs 119 and 120 swings the partition strips 74 and 75 downwardly accompanied by simultaneous folding of anchoring tabs 70 and 71 downwardly along their associated fold lines 72 and 73 to positions in which anchoring tabs 70 and 71 lie in flat face contacting relation with respect to the associated main panel 41. Upon completion of the operation of folder means 113, the insert such as 35 is in set-up condition as shown in FIG. 1 except for the fact that the partition tabs such as 44, 51, 58 and 65 together with their associated end tabs 47, 53, 61 and 66 are not yet manipulated into final set-up condition.

Figure 8:
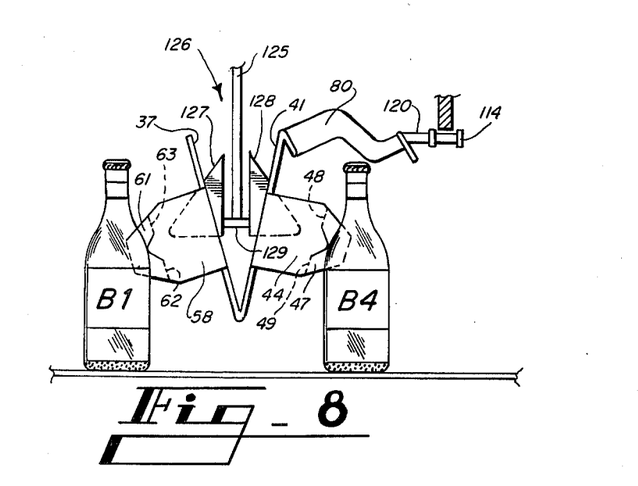
FIG. 8 is a cross sectional view taken along the line designated 8—8 in FIG. 4.
Figure 9:
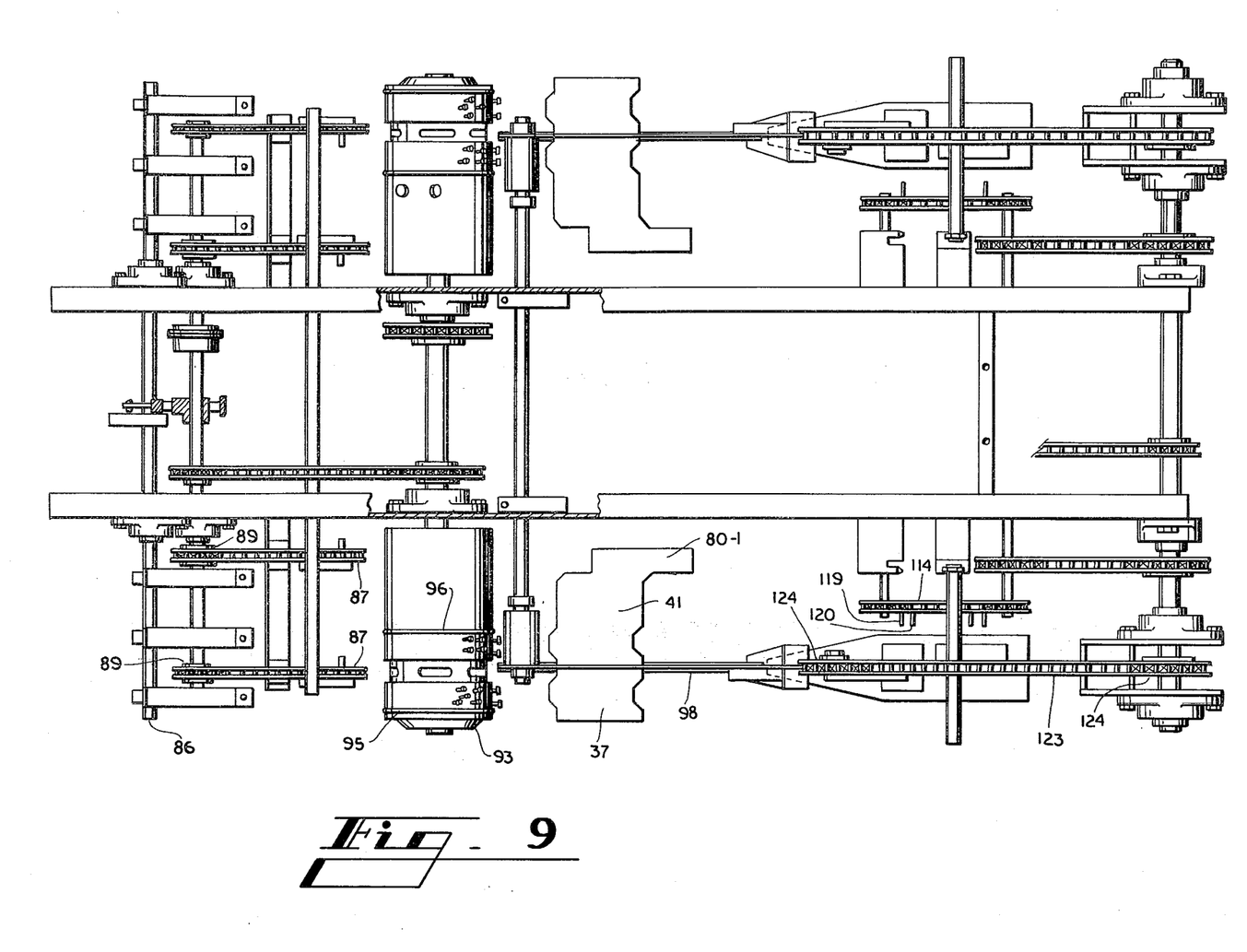
FIG. 9 is a plan view from above of the structure shown in profile in FIG. 4 but with certain parts removed for clarity.

In order to manipulate the partition tabs and their associated end tabs into set-up condition, tab folding means best shown in FIGS. 4 and 8 are employed. Such means comprises an endless element 123 driven by sprocket 124 and trained about idler sprocket 124a which sprockets are mounted on suitable shafts and which in turn are supported by bearing means mounted on the frame of the machine in any known manner. Guide plate 125 controls the endless element 123 on which are mounted a plurality of tab folders 126. Tab folders 126 include two elements as best shown in FIG. 8. which are designated by the numerals 127 and 128. These elements are suitably mounted to chain pins 129 which are guided by the fixed guide 125.

As is best shown in FIG. 4 endless element 123 includes an approach reach designated by the numeral 130 which extends downwardly together with a tab folding reach designated 131 and a disengaging reach designated by the numeral 132.

Thus with the insert blank folded somewhat beyond the stage shown in FIG. 6 and prior to the time when main panels 37 and 41 are disposed in flat face contacting relation with each other each tab folder 126 moves between main panels 37 and 41 which are disposed to form a V relationship. Tab folder 127 is arranged to cooperate with a partition tab such as is designated by the numeral 58 while tab folder 128 is arranged to cooperate with a partition tab such as 44. As is apparent from FIG. 4, the approach reach 130 can be arranged so that movement of each tab folder along the approach reach is at the same velocity as is the movement of lug chain 98 in a direction parallel to the movement of lug chain 98. Furthermore since the tab folding reach 131 is parallel to the adjacent portion of feeder chain 98, the velocity of movement of the endless element and of the associated tab folders along the tab folding reach 131 is at a velocity in excess of the velocity of the immediately adjacent portion of the feeder chain 98. Thus the tab folders such as 127 and 128 which are in engagement with partition tabs such as 58 and 44 respectively move at a velocity in excess of the velocity of movement of the blank and of course of the associated main panels 41 and 37. This difference in velocity causes the partition tabs to swing out of the planes of their associated main panels such as 41 and 37.

In order to manipulate the end tabs such as 61 and 47 into flat face contacting relation with their associated partition tabs 58 and 44, advantage is taken of the fact that the bottles which are to be packaged in conjunction with the particular insert and which have tapered neck portions may be utilized as means for engaging and folding the end tabs such as 47 and 61 as is indicated in FIG. 8. Thus folding movement of a partition tab such as 58 causes the associated end tab such as 61 to engage a bottle such as is indicated at B1 in FIG. 8. Swinging movement of the partition tab such as 58 in cooperation with engagement of the end tab 61 with the bottle B1 folds the end tab about its fold lines 62 and 63. Continued movement of the insert associated with transverse movement of a group of bottles including a bottle such as B1 forces the partition tab as viewed in FIG. 8 to the left relative to bottle B1 and thus forces the end tab 61 to fold into flat face contacting relationship with partition tab 58 while the entire insert is being lowered so that when the partition tab such as 58 and the associated end tab 61 move downwardly adjacent the wide body portion of the bottle, the partition tab and its associated end tab are secured between adjacent bottles. Thus a two-ply separator comprising partition tab 58 and its associated end tab 61 is disposed between bottle B1 and the associated bottle which is adjacent to bottle B1 but which is not shown in FIG. 8.

Figure 10:
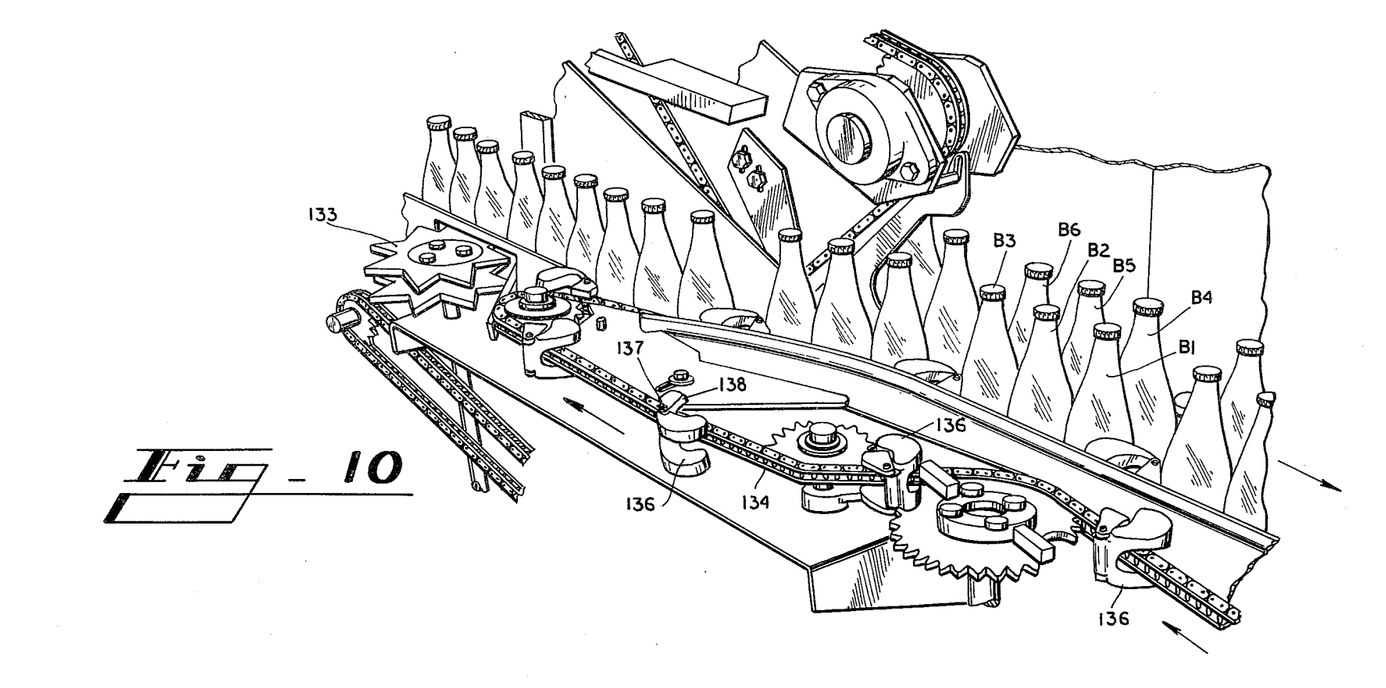
Figure 11:
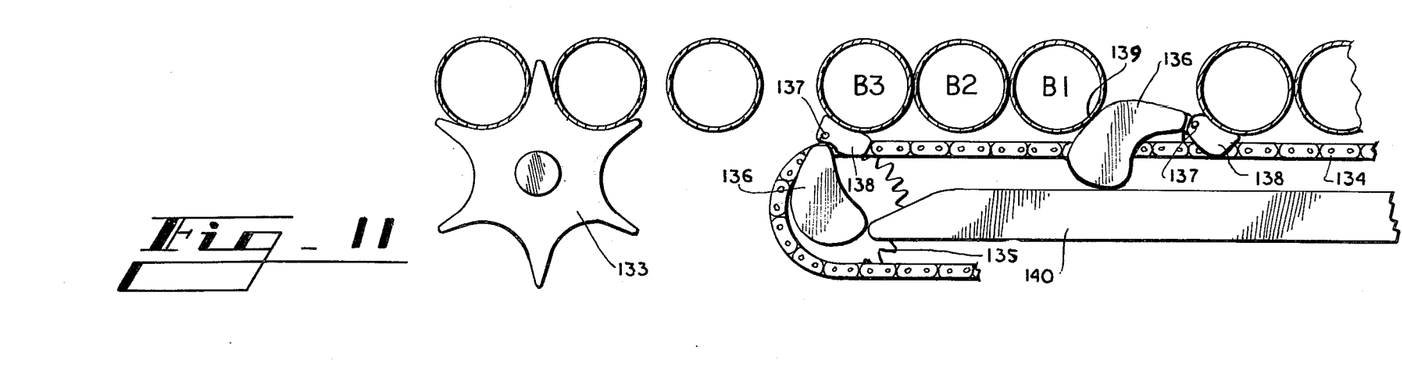
FIG. 11 is an enlarged fragmentary view of a portion of the machine shown in FIG. 10 and by which control of the bottles is effected.

In order to achieve the precise manipulation of the end tabs such as 61 and of all of the end tabs such as 47, 53 and 66 relative to the associated partition tabs 44, 51 and 65, it is necessary precisely to control the position and movement of a group of bottles such as are designated B1, B2 and B3 in FIG. 11. Toward this end, a starwheel such as in indicated at 133 controls the rate of infeed of a group of bottles to a position where the insert is moved into a bottle group. In addition an endless element 134 rotatable about a sprocket 135 and an associated sprocket not shown in FIG. 11 includes a plurality of spacer elements designated by the numeral 136. These spacer elements are pivotally mounted to endless chain 134 as indicated at 137. Each spacer element includes an article engaging pusher projection designated by the numeral 138 which moves into a position as indicated in FIG. 11 immediately behind a bottle such as B3. This engagement enables the pusher element such as 138 to impart movement toward the right of a group of articles designated B1, B2, and B3. In order to prevent articles from advancing toward the right ahead of article engaging pusher projection 138, an article engaging restraining projection 139 is formed on each spacer element and includes a part which engaged spacer control means 140 in such manner as to swing its associated spacer element in a clockwise direction as viewed in FIG. 11. This action causes the article restraining projection 139 of spacer element 136 to move in front of a bottle such as B1. By this means the position of a group of bottles such as B1, B2 and B3 is fixed relative to the endless feed element 134. Movement of this element 134 is synchronized with movement of pusher lugs 99 and their associated chain 98 as well as with the movement of the endless element 123 and its associated tab folder means 126 and 127 so as to insure precise and synchronized manipulation of the insert into proper relationship with the associated bottle group such as B1, B2 and B3. As is apparent in FIG. 10 each side of the machine receives two rows of bottles such as are designated for example by the numerals B1, B2, B3, B4, B5 and B6 so that once an insert is set up as is indicated at 35 in FIG. 1 such insert is lowered downwardly over a group of bottles such as are shown in FIG. 10 and designated B1-B6 inclusive so that after the insert is mounted within a group of bottles the entire group including the bottles and insert may then be moved inwardly through the open end of the container as shown in FIG. 1 by subsequent machine operations not disclosed herein and which are not deemed to constitute a part of this invention.

The embodiments of the invention in which an exclusive property or privilege is claimed are defined as follows:

1. In a carton loading machine in which containers are arranged in side-by-side rows prior to loading into a carton, said containers being continuously driven through a partition depositing station whereat a separating partition is transferred onto a group of containers, an improved device, for folding an article separating partition tab out of the plane of a partition panel to which the tab is foldably joined along a hinge line and for depositing said panel and tab into a group of bottles, wherein the improvement comprises means for advancing a group of bottles along a substantially horizontal path, means for advancing said panel at a predetermined velocity along a predetermined path disposed above and at a downwardly inclined angle to said horizontal path, an endless element having a tab folding reach substantially parallel to said predetermined path and an approach reach disposed at an angle to said predetermined path, the velocity of movement of said endless element being such that its velocity along said tab folding reach is in excess of the velocity of movement of said panel, and a tab folder mounted on said endless element and engageable with said partition tab so as to fold said partition tab along said hinge line and out of the plane of said panel, said panel and said tab being lowered into said group of bottles due to the downwardly inclined angle of said means for advancing said panel.

2. A machine according to claim 1 wherein said endless element includes a disengaging reach angularly disposed relative to said folding reach and along which said tab folder moves following completion of a tab folding operation.

3. A machine according to claim 1 wherein movement of said tab folder along said folding reach is in the direction of said hinge line.

4. A machine according to claim 1 wherein a row of at least two bottles is movable along said horizontal path of movement and wherein an end tab is foldably joined to said partition tab remote from said hinge line, said end tab being engageable with one of said bottles and being foldable thereby out of the plane of said partition tab and into substantially flat face contacting relation therewith while moving downwardly between adjacent bottles to provide a double thickness cushioning separator therebetween.

* * * * *